March 2, 1965  W. M. DILLON  3,171,423
COMBINATION ANTI-SIPHON VALVE AND BACKFLOW PREVENTER
Filed July 24, 1961
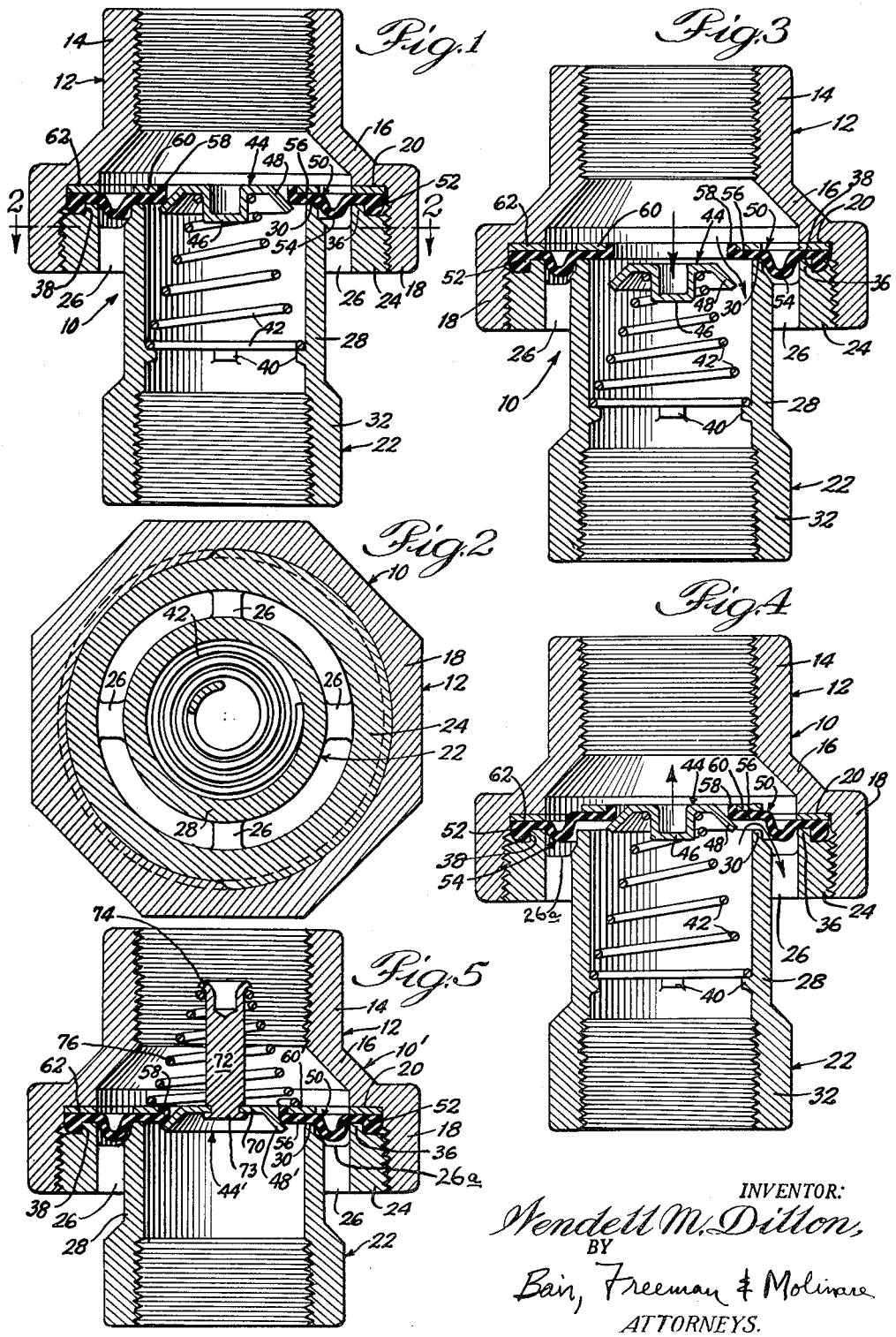
INVENTOR:
Wendell M. Dillon,
BY
Bair, Freeman & Molinare
ATTORNEYS.

United States Patent Office 3,171,423
Patented Mar. 2, 1965

3,171,423
COMBINATION ANTI-SIPHON VALVE AND BACKFLOW PREVENTER
Wendell M. Dillon, North Andover, Mass., assignor to Watts Regulator Company, Lawrence, Mass., a corporation of Massachusetts
Filed July 24, 1961, Ser. No. 126,289
6 Claims. (Cl. 137—218)

This invention relates to an anti-siphon valve and more particularly relates to a combination anti-siphon valve and backflow preventer for water supply lines or the like.

Anti-siphon valves and backflow preventers are well-known devices used to obviate the possibility of backflow of water that may be contaminated into the source of supply of fresh water.

The designs of anti-siphon valves disclosed in the instant patent application provide simple, effective, and inexpensive means to prevent siphoning and backflow.

Thus, the object of this invention is to provide an improved anti-siphon valve and backflow preventer that is of simple and inexpensive construction and is effective and efficient in operation.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 1 is a vertical axial cross-section view of an anti-siphon valve and backflow preventer constructed in accordance with the invention herein disclosed;

FIGURE 2 is a cross-section view taken on line 2—2 of FIGURE 1;

FIGURE 3 shows the device of FIGURES 1 and 2 with the valve member depressed as it would be when liquid is flowing from upstream to downstream through the valve;

FIGURE 4 shows the device of FIGURES 1 and 2 with the diaphragm raised from the valve seat to permit of venting, or discharge, of liquid from the downstream side of the valve as would occur in the prevention of backflow through the valve; and FIGURE 5 is a cross-section view similar to FIGURE 1 and showing a modified form of construction.

Referring now to the drawings, one form of the improved valve is shown at 10 in FIGURES 1-4. The valve 10 includes an upstream annular body part 12 that is provided with a female-threaded upstream connector sleeve 14 that is adapted to be connected to a liquid intake pipe. The lower end of sleeve 14 merges with a frusto-conical body portion 16, which terminates at its lower end in an annular radially-enlarged, female-threaded, connector 18. The body part 12 is further shaped to define a planar annular shoulder 20 that is located radially inwardly of the threaded connector 18.

The valve 10 also includes a downstream annular valve body part 22 that is provided with a male-threaded ring section 24 for selective detachable coupling to connector 18. The ring section 24 is attached to and spaced from a central, tubular portion 28 of body part 22 by means of a plurality of radial ribs 26. The space between ring 24 and tubular portion 28 is part of a venting means defined in the valve. The upstream end of the tubular portion 28 defines an annular valve seat 30 that is located radially inwardly of the venting means and that surrounds the axial flow passageway through tubular portion 28; and the downstream end of tubular section 28 is shaped to define female threaded connector sleeve 32 adapted for connection to a flow-receiving pipe.

The ring section 24 of the downstream body 22 is shaped to define an annular shoulder, or rib, 36 that is spaced radially inwardly of the threads on ring section 24, so that when the ring 24 is screwed into connector 18, the rib 36 is spaced from the inner peripheral wall of connector 18 to define therebetween an enlarged diaphragm-seating recess 38. The rib 36 is also positioned and spaced opposite a portion of annular shoulder 20 so as to accommodate therebetween a gasket and flexible diaphragm as hereinafter described.

The tubular section 28 of body 22 is provided with a plurality of internal shoulders, or bosses, 40 which are located substantially in a plane perpendicular to the longitudinal axis of tubular section 28. A frusto-conical coil spring 42 is provided in tubular section 28, with the large coil at the lower end of spring 42 seated against the internal bosses 40, and with a check-valve disc 44 supported by the small coil at the upper end of spring 42. The check-valve disc has a depressed portion, or centering stud, 46 which fits within the reduced upper coil of spring 42 to center the disc 44, relative to spring 42 and to tubular section 28, and to restrain the parts against lateral displacement. The check-valve disc 44 is also provided with an outwardly and downwardly flared flange 48 which is adapted for sealing engagement with a sealing diaphragm, as hereinafter described.

A flexible rubber diaphragm member 50 is provided having an integral enlarged outer peripheral bead 52 which is adapted to be seated and positioned in recess 38 that is defined between rib 36 and connector 18 and is located radially outwardly of the venting means. The portion of the diaphragm which extends radially inwardly of rib 36 is a flexing portion that is indicated at 54, and inwardly of said flexing portion 54 there is a flat diaphragm valving portion 56 that is adapted to seat against valve seat 30 and to move axially thereof. The radial innermost portion of diaphragm 50 is shaped to define an upwardly extending, inner, peripheral flange 58, which serves as a centering guide, or stud, for a washer 60 that seats therearound, and which washer 60 serves as a rigid backing plate for the flat diaphragm portion 56 which is adapted to seat against the valve seat 30. A large-diameter sealing washer 62 is provided interposed between annular shoulder 20 and the outermost portions of diaphragm 50. The radial ribs 26, at their upper axial ends, are recessed at 26a to be spaced below the valve seat 30 and rib 36 and to accommodate the downward flexing of diaphragm portion 54.

From the foregoing description of the structure, the operation of the combination anti-siphon valve and backflow preventer will now be understood. Considering the structure of FIGURES 1-4, normally when there is no flow of liquid in the line and the line is without pressure, the diaphragm 50 is deflected upward by spring 42 thereby causing it to leave its seated position against valve seat 30 and opening the interior of valve part 22 to the venting means through the spaces between ribs 26 as seen in FIGURE 4. When liquid, such as water, is turned on in the flow line, it enters valve body part 12 and presses against diaphragm 50 to move it downwardly from the position of FIGURE 4 to the position of FIGURE 1. Initially there is no flow into valve body part 22, as the check valve 44 is held by spring 42 against the periphery of the central orifice in the diaphragm 50.

As pressure builds up to some predetermined amount, which is determined by the strength of spring 42, it moves valve 44 away from its sealing engagement with diaphragm 50, as the diaphragm engages valve seat 30. The flow is then established through valve 10. The spring 42 holding valve 44 thereby creates a pressure drop between the interior of upstream body 12 and the interior of downstream body 22, so that the pressure above diaphragm 50 is always greater than the pressure below valve 44.

In the event that the water is shut off downstream of valve 10 and there is no flow, the pressure above diaphragm 50 is still maintained at a higher level than below valve 44.

If for any reason the pressure downstream of valve 44 should increase due to possible thermal expansion of the water, or the application of pressure through pumping means, the diaphragm 50 will lift away from valve seat 30, as seen in FIGURE 4, allowing water to spill over valve seat 30 for discharge through the space between ring 24 and tubular portion 28. The latter arrangement thus prevents backflow into the supply line and serves to vent the downstream line to atmosphere.

Assuming that there is a negative pressure created suddenly upstream of diaphragm 50, due to a break in the main or from some other cause, the sub-atmospheric pressure permits atmospheric pressure to be effective on diaphragm 50 and valve 44 to close the check valve 44 and push the diaphragm 50 upwardly from valve seat 30. Added to this is the effect of spring 42 which keeps check valve 44 closed against the seat on diaphragm 50 and also tends to lift diaphragm 50, thus allowing air to bleed in past valve seat 30 and to prevent any vacuum within downstream valve part 22. This is the anti-siphon feature of valve 10.

In the modified form of construction shown in FIGURE 5, parts similar to the parts heretofore described are given the same reference numerals. The modification in FIGURE 5 involves disposing the spring-biasing means for the check-valve disc 44' on the upstream side of the diaphragm or substantially within the upstream valve body part 12. The valve in FIGURE 5 is itself generally indicated at 10' and the check-valve disc is indicated at 44'. The check-valve disc 44' includes a beveled, or flared, peripheral flange 48' and a central flat portion 70 to which is rigidly connected an upstanding stud 72 that is provided with an upset head that engages the underside of central portion 70. The upper end of stud 72 is flared at 74 to provide a seat for the upper coil of a frusto-conical coil spring 76 that is positioned between said flared upper end 74 of stud 72 and a washer 60' which is carried by diaphragm 50.

The operation of modified form of device shown in FIGURE 5 is somewhat different than in FIGURES 1–4, in that the spring 76 of FIGURE 5 does not tend to unseat the diaphragm 50 from engagement with its valve seat 30. When water pressure is first turned on, it tends to build up a pressure which forces the diaphragm 50 down against valve seat 30, thereby closing off any passage of venting air past valve seat 30. With additional build-up in pressure, the check valve 44' is forced downwardly against the bias of spring 76, to move away from sealing engagement with diaphragm 50 and to allow water flow through the central aperture of diaphragm 50. The check valve 44' will remain open as long as there is flow through the valve 10'. With the supply of water shut off, the pressure upstream of diaphragm 50 will immediately drop until the check valve 44' seats against the diaphragm under the bias of spring 76. Some pressure remains above diaphragm 50, depending upon the loading of spring 76. However, should a negative pressure be developed upstream of diaphragm 50, the check valve 44' will close even tighter against its seat on diaphragm 50, and atmospheric pressure which is communicated against the underside of diaphragm 50 will move the diaphragm 50 up and away from valve seat 30, so that air will then rush in past valve seat 30 and into the tubular portion 28 of downstream valve part 22, thereby preventing a vacuum in the portion of the line to which the valve part 22 connects.

Devices of the foregoing type are used extensively where the outlet from a potable water supply may be below the flood rim of a fixture or vessel, or where a hose of any type or a portable shower head may be used, as in beauty parlors and the like, and where the hose or shower head may enter a contaminated pool of water or chemicals. These vacuum-breaking valve devices, when in small size, may be used on the supply line to individual appliance or outlets. Valves of larger size, particularly of the type shown in FIGURES 1–4, are adaptable to main supply lines leading to a building and will operate to prevent contaminants within a specific location from flowing back into the supply main in the street.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. An anti-siphon valve and backflow preventer comprising, in combination: an upstream valve body defining a liquid flow passageway, a downstream valve body connected to said upstream valve body and defining an axial liquid flow passageway surrounded by an annular valve seat, venting means defined in said downstream valve body and located radially outwardly of said valve seat, diaphragm seating means defined radially outwardly of said venting means, an annular diaphragm member of resilient material having an outer portion seated in said seating means and an annular valving portion spaced radially inwardly of said outer portion and adapted to move axially toward and away from said valve seat, said annular valving portion surrounding a central flow aperture through said diaphragm member, a valve member separate from said diaphragm member positioned centrally of said annular diaphragm member and adapted to sealingly seat thereagainst on the downstream side thereof for sealing said central flow aperture, spring means biasing said valve member toward sealing engagement with said resilient annular diaphragm member, and a rigid backing washer carried by and movable with the diaphragm member and positioned opposite the valve seat, whereby said annular valving portion of the resilient diaphragm member which moves toward and away from said valve seat is positioned between said backing plate and said valve seat.

2. An anti-siphon valve and back flow preventer comprising, in combination: valve body means defining an upstream liquid flow passageway, a downstream axial liquid flow passageway surrounded by an annular valve seat, and venting means located radially outwardly of said valve seat; diaphragm-valve means for separating the upstream liquid flow passageway from the downstream flow passageway and venting means, said diaphragm-valve means including an annular diaphragm member of resilient material secured to the valve body means radially outwardly of the valve seat and venting means, said annular diaphragm member being shaped to define a central flow aperture therethrough, an annular valving portion surrounding the central aperture and adapted to have its downstream side engage and seal against said annular valve seat, a rigid annular backing washer engaging the upstream side of said annular valving portion and being movable with said valving portion as it is moved away from and toward the annular valve seat, a check valve member for sealing against a portion of the diaphragm member opposite that portion engaged by said annular backing washer, so as to close off the central flow aperture, and means biasing the check valve member toward closed valve condition.

3. An anti-siphon valve and back flow preventer comprising, in combination: valve body means defining an upstream liquid flow passageway, a downstream axial liquid flow passageway surrounded by an annular valve seat, and venting means located radially outwardly of said valve seat; diaphragm-valve means for separating the upstream liquid flow passageway from the downstream flow passageway and venting means, said diaphragm-valve means including an annular diaphragm member of resilient material secured to the valve body means radially outwardly of the valve seat and venting means, said annular diaphragm member being shaped to define a central flow aperture therethrough, an annular valving portion surrounding the central aperture and adapted to have its downstream side engage and seal against said annular valve seat, a peripheral flange at the innermost edge of the annular valving portion extending upwardly of the annular valving portion and bounding the central aperture, a rigid annular backing washer engaging the upstream side of said annular valving portion and the outer periphery of the peripheral flange and being movable with said valving portion as it is moved away from and toward the annular valve seat, a check valve member for sealing against a portion of the diaphragm member opposite that portion engaged by said annular backing washer, so as to close off the central flow aperture, and means biasing the check valve member toward closed valve condition.

4. An anti-siphon valve and back flow preventer comprising, in combination: valve body means defining an upstream liquid flow passageway, a downstream axial liquid flow passageway surrounded by an annular valve seat, and venting means located radially outwardly of said valve seat; diaphragm-valve means for separating the upstream liquid flow passageway from the downstream flow passageway and venting means, said diaphragm-valve means including an annular diaphragm member of resilient material secured to the valve body means radially outwardly of the valve seat and venting means, said annular diaphragm member being shaped to define a central flow aperture therethrough, an annular valving portion surrounding the central aperture and adapted to have its downstream side engage and seal against said annular valve seat, a peripheral flange at the innermost edge of the annular valving portion extending upwardly of the annular valving portion and bounding the central aperture, a rigid annular backing washer engaging the upstream side of said annular valving portion and the outer periphery of the peripheral flange and being movable with said valving portion as it is moved away from and toward the annular valve seat, a check valve member with a flange that flares outwardly in a downstream direction for sealing against a portion of the diaphragm member opposite that portion engaged by said annular backing washer, so as to close off the central flow aperture, and means biasing the check valve member toward closed valve condition.

5. A device as set forth in claim 2 werein the means biasing the check valve includes a spring member which is seated upon the rigid annular backing washer.

6. A device as set forth in claim 2 wherein the means biasing the check valve is a conical coil spring and the check valve member has an axially extending stud part thereon adapted to centeringly receive and engage a reduced upper coil of the conical coil spring.

References Cited by the Examiner

UNITED STATES PATENTS

| 2,117,389 | 5/38 | Yoder | 137—218 |
| 2,174,742 | 10/39 | Groeniger | 137—218 |
| 2,382,427 | 8/45 | Langdon | 137—218 |
| 2,888,947 | 6/59 | Montgomery | 137—543.17 XR |
| 3,005,616 | 10/61 | Seele | 137—218 XR |
| 3,023,767 | 3/62 | Woodford | 137—218 |
| 3,083,723 | 4/63 | Duchin | 137—218 |

FOREIGN PATENTS

| 1,206,106 | 8/59 | France. |
| 692,383 | 6/40 | Germany. |
| 527,201 | 10/40 | Great Britain. |

ISADOR WEIL, *Primary Examiner.*

M. CARY NELSON, WILLIAM F. O'DEA, *Examiners.*